Rundlett & Drummond,
Hay Press,
№ 24,824. Patented July 19, 1859.
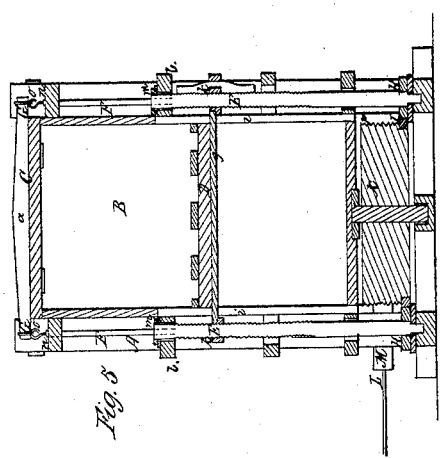
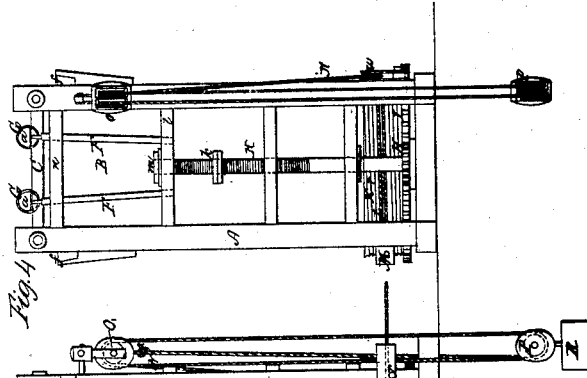
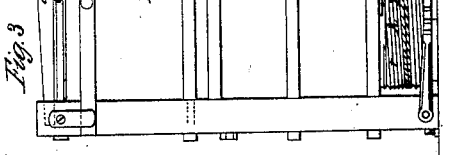
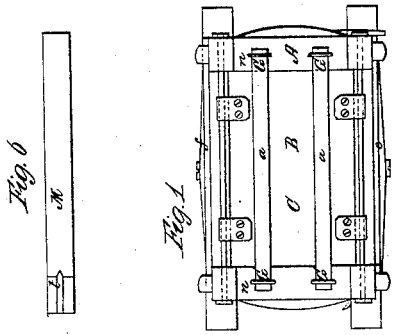
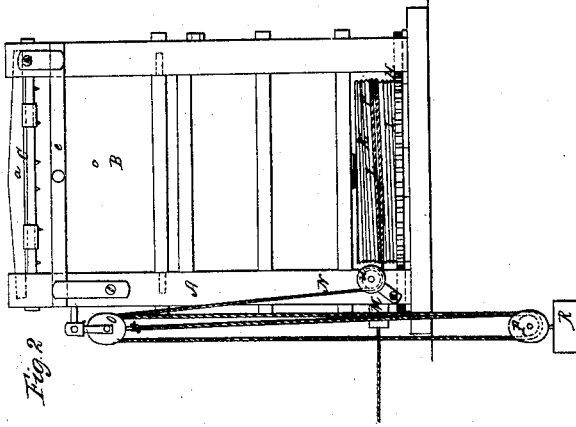
Witnesses:
Josiah H. Drummond
Everett R. Drummond
Inventors:
Charles Rundlett
John W. Drummond

UNITED STATES PATENT OFFICE.

CHARLES RUNDLETT, OF ALDEN, AND JNO. W. DRUMMOND, OF WINSLOW, ME.

IMPROVED HAY-PRESS.

Specification forming part of Letters Patent No. 24,824, dated July 19, 1859.

*To all whom it may concern:*

Be it known that we, CHARLES RUNDLETT, of Alden, in the county of Lincoln and State of Maine, and JOHN W. DRUMMOND, of Winslow, in the county of Kennebec and State aforesaid, have invented an Improved Hay-Press; and we do hereby declare that the same is fully described and represented in the following specification and the accompanying drawings, of which—

Figure 1 is a top view. Figs. 2 and 3 are front and rear elevations; Fig. 4, a side elevation; and Fig. 5, a longitudinal section of it, the said section being taken through the platen-elevating screw.

The nature of our improvements or invention consists in the arrangement of the driving-pulley and gear with reference to the press-box, and the platen-screws and pinions disposed on the sides of the press-box; also, in a combination and arrangement of two or more connecting rods or rings with each platen-elevating screw and the bars of the cover of the press-box; also, in the mode of applying the draft-rope guide to the press-frame, and the helical groove in the periphery of the driving-pulley.

In the said drawings, A exhibits the frame of the machine, and B the press-box contained within the said frame, the said box being provided with a cover, C, hinged to it, and furnished with strengthening-bars a a, affixed to the upper surface of the said cover C, and made to project beyond its rods, as shown in Figs. 1 and 5. Furthermore, the upper portion of the front and rear sides of the press-box may be hinged to the lower part, as in other hay-presses, so as to be capable of being turned downward for the discharge of the bundle of hay after it may have been pressed. The parts so movable are denoted in Figs. 2 and 3 by the letters c d, and are furnished with long turn buttons e f, for holding them in vertical position. Within the press-box there is a platen, D, which rests on a metallic frame or cross-bar, g, that extends through opposite sides of the press or vertical slots i i, made therein, and carries nuts or female screws k k, that receive, respectively, two vertical male screws, E E, arranged on opposite sides of and outside the press-box and in the frame A, as shown in the drawings. Each of the said male screws extends upward through a cross-bar, l, of the frame A, and is furnished with a head, m, to rest on the cross-bar, as shown in Figs 4 and 5, the screw not screwing into the cross-bar, but simply passing through it, so as to be capable of being revolved within it. Two rods, F F, are carried upward from the said cross-bar on opposite sides of the screw, and also through the upper cross-bar, n, of the frame, and terminate in eyes o o, furnished, respectively, with rings G G, or their equivalents, for the reception of the ends of the bars extending across the top of the cover C. Furthermore, at the lower part of each screw B there is a toothed pinion, H. The two pinions H H engage with a driving-gear, I, affixed to the lower side of a windlass or driving-pulley, K, arranged underneath the press-box B and within the frame A, as shown in the drawings. This driving-pulley has a spiral groove, p, formed in its periphery, such groove being for the reception of the coils of a draft-rope, L, which extends through a tubular spout, M, that turns vertically near its outer end upon a fulcrum, r, while its inner end bears against the grooved periphery of the driving-pulley, and is scored or formed with one or more helical projections, t, to enter the groove of the pulley. A staple or guide, s, serves to maintain the spout M in contact with the driving-drum. Fig. 6 exhibits an inner side view of the spout M, showing at t the projecting or scored part, which operates in connection with the helical groove of the driving-drum. The purpose of the said spout, so applied to the frame A and the drum K is to guide the draft-rope properly into the groove of the windlass during the descent of the platen produced by the operation of the return weight and tackle. Such return weight and tackle are exhibited in Figs. 2 and 4, and consist of rope N, attached to the periphery of the windlass and carried through a leading-block, u, arranged as shown in Fig. 2. From thence the rope is rove through two blocks, O P, and finally attached to the uppermost of said blocks, which is suspended from the press-frame, as shown at O in the drawings. The lowermost of said blocks, or that marked P, has a weight, R, depending from it, the same being sufficient to set in motion the windlass and the platen-screws, or the operative mechanism of the latter, in order to lower the platen downward preparatory to the press-box being supplied with hay.

In pressing hay into bundles or bales by the said press, a horse or other draft-animal may be supposed to be necessary, he being attached to the draft-rope L. While being driven away from the press, the draft-rope will be drawn from the windlass, so as to set it in rotation, and thereby put in operation the mechanism for elevating the platen.

The arrangement of the parts of such press, particularly that of the windlass and driving-gears, is one of great convenience, as it not only renders the machinery convenient of access, but easily operated, and brings the whole press and its mechanism into small compass. The return weight and tackle are of much advantage in operating the platen, as by means of such the press can be worked with much more dispatch than without them, the guide-spout M being necessary when such return weight and tackle are employed. A press so constructed will operate to excellent advantage.

What we claim is—

1. The arrangement of the driving-drum or windlass K and the driving-gear I with reference to the press-box B and the platen-screws D E and their pinions, disposed on the sides of the press-box.

2. The combination and arrangement of the connecting-rods F F and rings G G with each platen-elevating screw E and the bars of the cover of the press-box, the whole being to operate as specified.

3. The mode of applying the draft-rope guide M to the press-frame and the driving-pulley—that is, by means of a fulcrum, r, and the screw or projection made to enter the helical groove of the driving-pulley.

In testimony whereof we have hereunto set our signatures.

CHARLES RUNDLETT.
JOHN W. DRUMMOND.

Witnesses:
JOSIAH H. DRUMMOND,
EVERETT R. DRUMMOND.